June 10, 1930.  C. F. BURKHARDT  1,762,257
CULINARY UTENSIL
Filed June 17, 1929   3 Sheets-Sheet 1
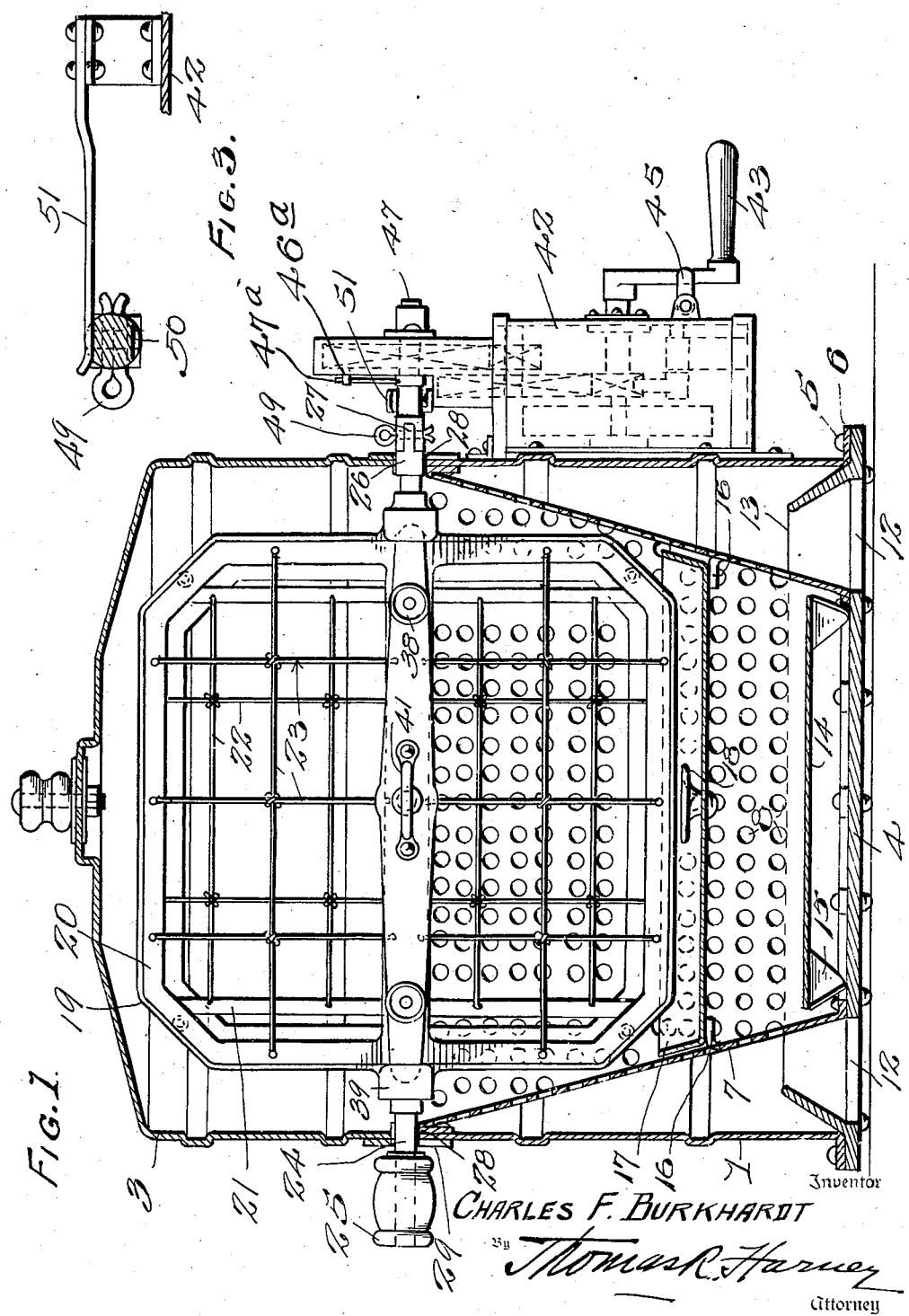
Inventor
CHARLES F. BURKHARDT
By Thomas R. Harney
Attorney

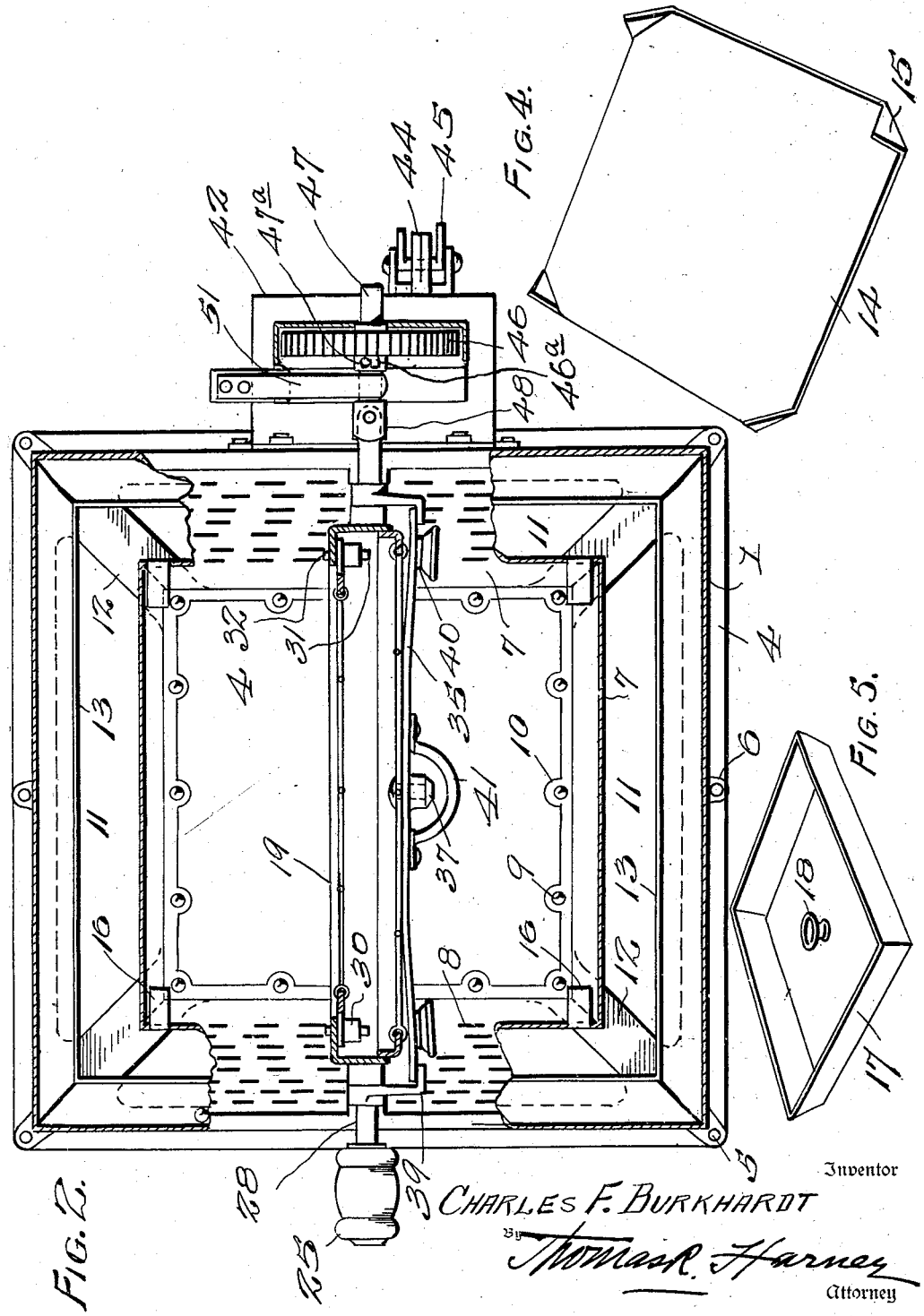

June 10, 1930. C. F. BURKHARDT 1,762,257
CULINARY UTENSIL
Filed June 17, 1929 3 Sheets-Sheet 3
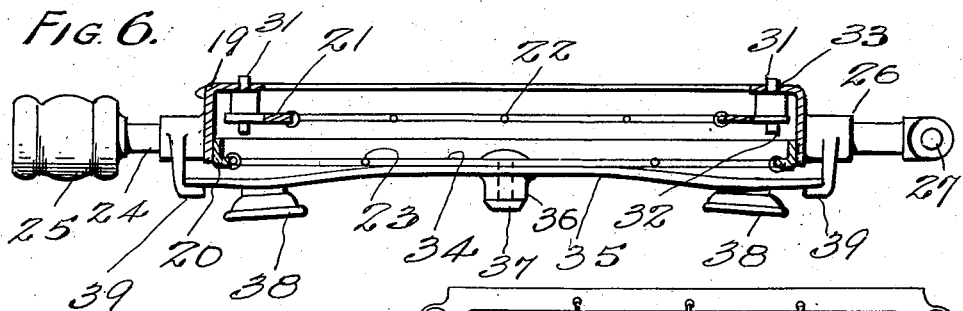
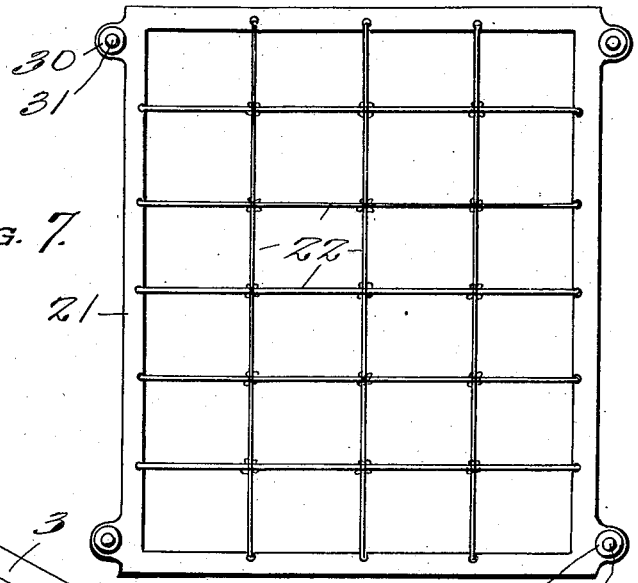
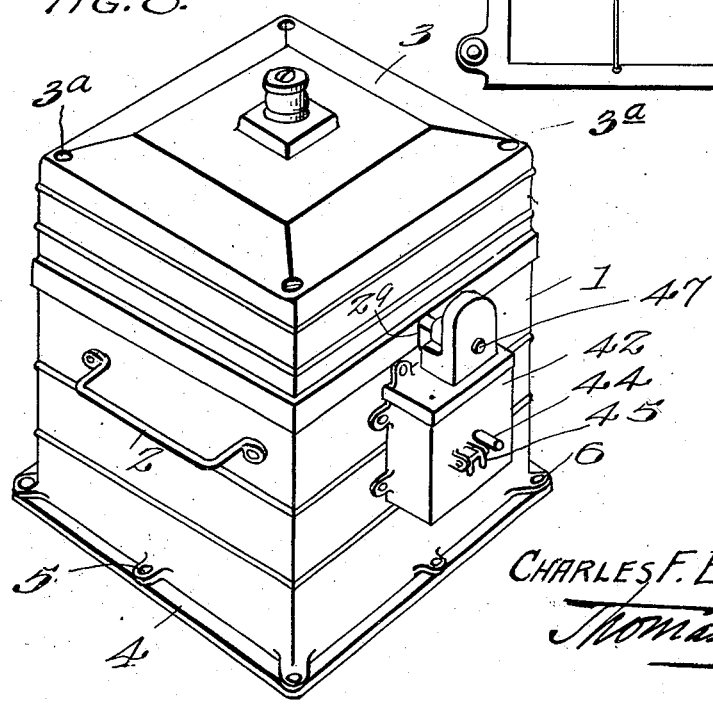
Inventor
CHARLES F. BURKHARDT
Thomas R. Harney
Attorney Patented June 10, 1930

1,762,257

UNITED STATES PATENT OFFICE

CHARLES F. BURKHARDT, OF WASHINGTON, DISTRICT OF COLUMBIA

CULINARY UTENSIL

Application filed June 17, 1929. Serial No. 371,573.

My present invention relates to an improved culinary utensil in which are combined features or elements that adapt the utensil for baking, broiling, roasting, toasting, warming, and various other culinary processes.

While my utensil may be heated electrically, by the use of an oil stove, or by placing it upon a coal range to receive heat therefrom, I preferably utilize a gas stove or gas burner to supply the heat to the interior of the receptacle or utensil.

In carrying out my invention I utilize a lid or cover for most of the cooking processes, and I also utilize a rotary grid or carrier within the interior of the utensil for broiling, toasting, &c.

The utensil is simple in construction and compactly arranged, thus insuring facility in manufacture and low cost of production; it is possessed of ample or adequate capacity for fulfilling its functions; and it is particularly economical in the consumption of fuel for heating purposes. As a protable oven, the utensil may quickly be heated and readily maintained at a uniform and regular temperature, and after use, the heat is dissipated and the utensil quickly cooled.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention. It will be understood that the drawings illustrate one exemplification of my invention, and that various changes as to size, shape, and arrangements of parts may be made in the exemplified structure, within the scope of my claims without departing from the principles of my invention.

Figure 1 is a vertical sectional view through a covered utensil embodying my invention, the rotary grid being shown therein together with mechanical means, as a clockwork mechanism, for rotating the grid.

Figure 2 is a plan view of the utensil with the cover removed and parts broken away for convenience of illustration, the rotary grid being shown as arranged for a thick slice of toast, or a comparatively thick steak or chop to be broiled.

Figure 3 is a detail view showing a section of the rotary shaft of the grid showing a friction spring bearing thereon.

Figure 4 is a perspective view, reduced scale, of the false or removable bottom of the utensil, the bottom being shown in inverted position for convenience of illustration.

Figure 5 is a perspective view, also on a reduced scale, of a removable tray or pan that is located below the rotary grid to catch and retain the juice or gravy when meat is being broiled.

Figure 6 is a detail view of the rotary carrier or grid, detached, and adjusted to accommodate a thin slice of toast or thin steak.

Figure 7 is a face view of the reversible or interchangeable grid-rack, and Figure 8 is a perspective view showing the exterior of the utensil.

The body 1 of the receptacle portion of the utensil, while here shown as rectangular, may be of other desired or suitable shape, and is preferably fashioned from sheet metal or sheet steel, and handles 2 may be attached to the body for manipulating the utensil. A removable lid or cover 3 is designed to fit over the top edge of the receptacle, and the cover which is provided with vent holes $3^a$ may or may not be used, depending upon the requirements of various cooking processes.

A base plate 4, preferably of cast metal, and slightly larger than the cross area of the receptacle, forms the bottom of the utensil, and this plate is secured, as by rivets 5 and lugs 6, to the bottom of the sheet metal receptacle. The base plate is of course designed to rest upon the top of a gas stove, or over a gas burner, and is substantial in character in order to withstand the heat, prevent warping, or other deformation of parts of the utensil.

Within the interior of the receptacle a tapered wall 7 is provided at the four sides of the receptacle, and these walls, which are perforated as at 8, converge inwardly from the upper edge of the receptacle toward the base plate, to which they are riveted at 9, the rivets being passed through lugs 10 and the base plate.

A hot air space or flue is thus provided between the four straight side walls of the receptacle and the complementary converging walls of the interior of the receptacle, and the hot air currents from the stove or burner pass through slots 11 in the base plate into these spaces and thence through the perforations to the interior of the receptacle in which a cooking chamber is provided.

The four slots 11 extend along the edges of the base plate, and at the corners of the slotted plate are provided diagonally extending brace arms 12 for rigidly connecting the inner and outer walls of the receptacle.

As the air currents rise through the slots into the heating spaces between the inner and outer walls, they are deflected toward the perforated walls by means of a rectangular, tapered, deflector 13, integral with the base plate, and which projects upwardly into the spaces at the four exterior sides of the inner tapered wall.

A removable bottom-plate 14 is provided with corner legs or feet 15, which rest upon the base plate within the receptacle, and this plate is used to distribute the heat arising from the base plate and passing the edges of the bottom plate, to prevent concentration of intense heat at the central portion of the cooking chamber.

The heated air currents pass through the perforated walls 7 to the interior of the cooking chamber, from which chamber the hot air escapes if the lid is removed, or the heat is retained when the lid or cover is in place and the interior of the utensil forms an oven or warming chamber in which victuals may be baked, cooked, or warmed.

At the four corners of the walls of the cooking chamber are provided horizontal lugs 16 that may be fashioned by punching out or striking up the metal of the walls to form supports for various devices, as a tray 17, to be used when broiling meat, as in Figure 1. The tray is provided with a knob or handle 18 and a fork, or other implement may be used, when the tray is hot, for lifting the tray out of the cooking chamber.

In some instances the rack of Figure 7 may be substituted for the tray in Figure 1, as when potatoes or apples are to baked, and these latter are deposited on the rack for the purpose, the lid or cover of course being closed for the purpose of confining the heat in the oven.

Combined with the oven as a feature of the utensil, I utilize a rotary grid or carrier that is adapted to be disposed transversely of the cooking chamber and rotated therein, either by mechanical power, or manually, for broiling, toasting, roasting, or otherwise treating victuals. The rotary grid or carrier comprises essentially three elements or parts, as an open frame 19 that may if desired, remain at all times in the cooking chamber regardless of the nature of the cooking process; a clamping frame 20; and a reversible or interchangeable grid-rack 21, the two latter members being separable from one another and removable from the cooking chamber, and also separable from the grid frame 19. The clamp-frame or rack 20 is provided with crossed wires 23 and the grid rack 21 is provided with cross wires 22 between which the article to be heated is carried in the rotary grid.

The several pieces of the rotary grid are of generally rectangular shape and the rotary device is of a size so that it may readily be turned or revolved within the cooking chamber.

The open grid frame 19 is fashioned of angle-plates or angular sheet metal strips, and the clamp member is also fashioned of angular metal strips, but it is apparent that these three grid members may be fashioned in various ways, in order that the article to be treated in the cooking chamber may be carried thereby.

The grid-frame is open so that access may be had through the frame, in the absence of the other two members 20 and 21, to the interior of or the bottom of the receptacle, when depositing articles therein and removing articles therefrom.

In order that the rotary grid may be rotated or revolved, the grid frame is provided with alined trunnions, the trunnion 24 having a handle 25 and the trunnion 26 having a perforated rounded head 27, the trunnions having journal bearings 28 in the upper edge of the receptacle or body of the utensil.

By means of the handle or knob 25, the rotary grid may manually be revolved under some conditions if desired, and by means of this handle the grid may be swung up and out of the receptacle on its pivot pin 47 in order to gain access to the grid for arranging its parts, and the lower edge of the lid or cover is notched or cut away as at 29 to permit the cover to fit over the upper edge of the receptacle while the rotary grid is in its bearings.

The reversible or interchangeable and removable grid-rack 21 is adapted to be supported in the grid frame, and for this purpose the rack is provided at its four corners with bosses 30 that are fashioned with alined end pins 31 and 32, the latter pins passing through and attaching the bosses to the frame portion of the rack 21. The bosses are located at one side of the rack and their pins 31, 32 are adapted for alternate or selective insertion in pin-holes 33 in the grid-frame 19. Thus, in Figure 2, with pins 32 inserted in the holes 33, the grid is adapted to accommodate a thick slice of bread for toast, or a thick slice of steak for broiling, while in Figure 6 where the rack is reversed as to position, with the pins 31 in the holes 33, the grid is adapted to accommodate a thin slice of toast or a thin slice of meat, between the clamp-rack and the interchangeable rack.

The clamp frame or rack 20 is provided with means for fastening the three grid parts together, and for this purpose the clamp-frame has a central cross plate 34 upon which is pivoted a spring blade 35, a bushing 36 on the blade and a pin 37 on the plate being utilized to permit pivotal movement of the blade. The blade is of course resilient, and near its ends are provided with push-cups 38 fashioned of heat-conducting material, or in suitable manner insulated against heat, to protect the finger and thumb as they are applied thereto.

For co-operation with the ends of the resilient clamp blade, the grid frame is provided with a pair of flanges or hooks 39 projected laterally from the trunnion of the grid, and it will be apparent that by pressure on the push-buttons and a turning movement of the spring blade, the ends of the latter may be engaged under the hooks to clamp the grid parts and also the commodity carried by the grid. The parts of the grid may of course be unclamped or released by a reverse movement of the spring blade. If desired or necessary, heat insulating washers 40 may be interposed between the push buttons and the spring blade for the protection of the finger and thumb used to press the buttons.

In Figures 1 and 2 a semi-circular handle 41 is shown as attached to the spring blade, and this handle may be used as in these figures of the drawing, or as indicated in Figure 6 the handle 41 may be dispensed with, and the spring blade is manipulated by pressure on the push-buttons.

As before indicated, the rotary grid, under some conditions, may be manipulated manually by the use of the handle or knob 25, but I prefer to use a mechanical device, as a clock-work mechanism, for rotating the grid within the oven.

The clock-work mechanism of suitable type is shown by dotted lines as enclosed within a housing 42, attached to one side of the oven, and the mechanism is wound by the use of a crank handle 43 on the crank shaft 44. The mechanism includes a spring, gears, pinions, escapement, &c., and of course the spring actuates the motor or mechanism for continuously rotating the grid, until the spring "runs down." Preferably the crank handle remains on the crank shaft while the motor is revolving the grid, and this rotation of the crank handle is a visible sign or indicator, to the attendant, that the rotary grid is operating, and may require attention.

After the spring-motor is wound, if the grid is not to be used, a U-shaped safety hood 45, pivoted on the housing 42, may be turned up to position in Figure 1 for holding the motor inoperative. When turned up, the hook is in the path of the crank handle, and as the latter is urged by the motor against the hook, the latter is held in place.

The driven wheel 46 of the motor is loosely journaled on the driven shaft 47, and the shaft is journaled in the housing 42. The loose wheel 46 transmits power to the shaft by means of a pin 46$^a$ fixed on the wheel and adapted to contact with an arm 47$^a$ carried by the shaft in the path of movement of the pin. The shaft is provided with a bifurcated and perforated head 48 complementary to the trunnion-head 27, and a coupling pin 49 is passed through these complementary heads so that they will transmit the rotary motion from the spring wound motor to the grid, and this pin is also used as a pivot when the grid is swung up and out of the oven.

As seen in Figure 3 the shaft is fashioned with a pair of opposed flat faces 50 that form edge shoulders, and a spring blade 51, anchored on a bracket of the housing 42, bears on the flat faces and the shoulders as the grid revolves.

The spring blade intermittently accelerates the rotation of the grid, as the edges of the grid pass through the lower portion of the oven. Thus, in Figure 1, the toast in the lower edge of the vertically disposed grid may be subjected to greater heat than the toast carried in the upper part of the grid, were it not for the fact the spring accelerates the rotation of the grid at this point, and hastens its movement from vertical toward the horizontal position. This accelerated movement is made possible by the use of the loose driven wheel and its laterally projecting pin 46$^a$ and the radially projecting arm 47$^a$ carried by the shaft in the path of movement of the pin.

Having thus fully described my invention, what I claim as new and desire to secure by Letters Patent is:—

1. In a culinary utensil, the combination with a slotted base plate and an outer wall secured thereon and a container secured to the base plate within the slotted portion, said container having outwardly flaring walls and perforations therein, and an inwardly converging deflector wall above a portion of the base-plate-slot.

2. The combination in a culinary utensil with a base plate having slots near its periphery, an outer wall secured to the base plate, and an inner wall secured to the plate within the slots, said inner wall flaring upwardly and outwardly from the plate and having perforations therein, said inner and outer walls forming a heating space therebetween, an inwardly tapering deflector plate integral with the bottom plate and rising over the slots to direct air currents to the perforated wall, and means within the inner wall for supporting a removable tray.

3. The combination in a culinary utensil with a base plate having a series of border-slots and corner brace-arms, spaced inner and outer walls forming a heating space above the slots, and means for fastening the walls to the plate, of an inwardly tapering deflector wall above the slots and projecting into said space, a plurality of supporting lugs on the inner wall, said inner wall having perforations therein and flaring outwardly from the base plate to the upper edge of the outer wall, and a cover for the utensil.

4. In a culinary utensil, the combination with a heating chamber, of a rotary grid supported in the chamber and operating means therefor, said grid having a pivotal connection to permit displacement from the chamber, a separable part to the grid, and means for fastening said separable part.

5. The combination with a heating chamber, of a rotary grid comprising a frame, a reversible rack and means thereon for adjusting said rack in the frame, and a clamp frame for the grid.

6. The combination with an open grid-frame having trunnions, supports for the trunnions, and means for rotating the grid-frame, of a separable rack and means thereon for adjusting said rack in the open frame, a spaced clamp frame for co-action with the rack, and means for fastening the clamp frame to the grid-frame.

7. In a rotary grid, the combination with an open grid-frame having trunnions and supports for the trunnions and means for rotating the grid frame, of a clamp frame and co-acting means on said frames for fastening them together, an intermediate rack, and means on the rack for varying the space between said rack and the clamp frame.

8. The combination with a grid-frame, a clamp frame, and co-acting means for clamping together said frames, of an intermediate spacing rack, spacing bosses on one side of the rack, and pins at the opposite ends of said bosses for selective co-action with holes in said grid-frame.

9. In a rotary grid, the combination with a frame having trunnions and a support therefor, of a driving shaft connected to one of the trunnions and a motor for said shaft, a separable clamp frame and co-acting means for fastening said frames, and an intermediate rack frame.

10. In a rotary grid, the combination with a frame having trunnions and a support therefor, of a driving shaft connected to one of the trunnions and a motor for the shaft, a pivotal pin between the shaft and trunnion, a separable clamp frame and fastening means therefor, and an interchangeable rack frame.

11. In a rotary grid, the combination with a frame having trunnions, of a driving shaft and a pivotal connection between said shaft and a trunnion, and means for retarding or accelerating the rotary movement of the grid.

12. In a rotary grid, the combination with a shaft having opposed flat faces and a spring-blade having frictional engagement on the shaft, of a grid frame having trunnions, a pivotal connection between one of the trunnions and said shaft, a separable clamp frame and clamping means therefor, and an intermediate reversible rack.

In testimony whereof I have affixed my signature.

CHARLES F. BURKHARDT.